May 8, 1923.
M. J. L. TOWLER
1,454,578
DIFFERENTIAL GEARING
Filed April 19, 1919
3 Sheets-Sheet 1
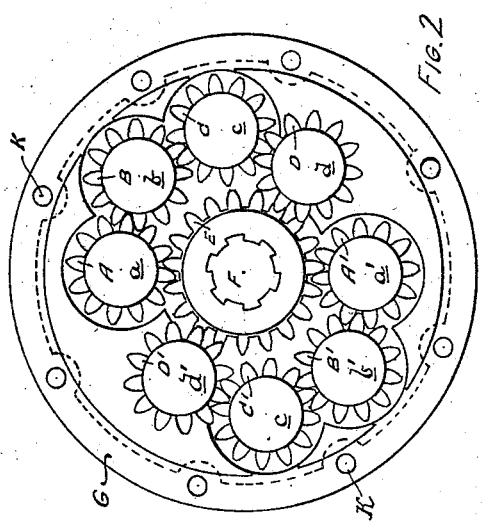
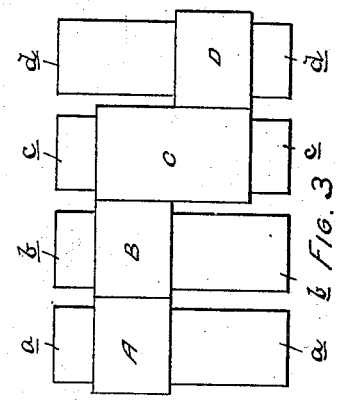
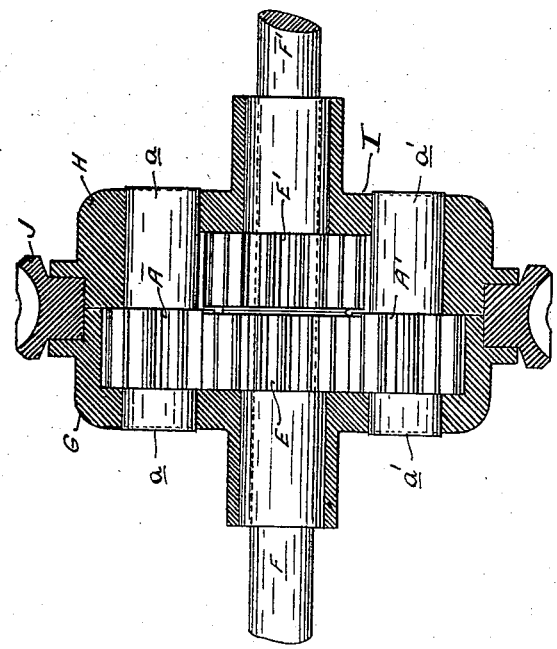
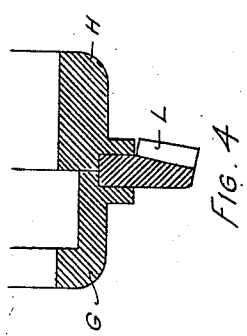

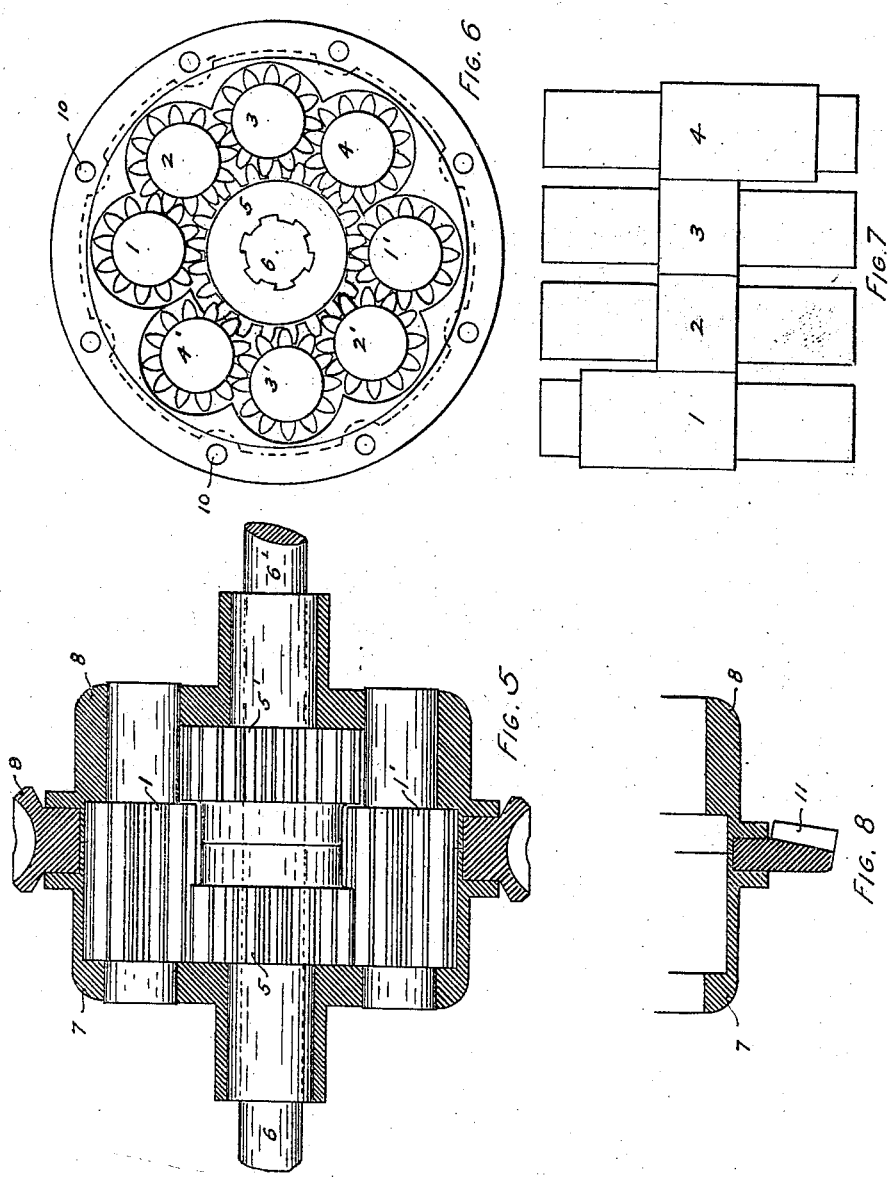

May 8, 1923.

M. J. L. TOWLER 1,454,578

DIFFERENTIAL GEARING

Filed April 19, 1919

Witnesses
Anna M. Dorr
Chas. W. Stauffiger

Inventor
Maximilian J.L. Towler
by Barthelt Barthel
Attorney

Patented May 8, 1923.

1,454,578

UNITED STATES PATENT OFFICE.

MAXIMILIAN J. L. TOWLER, OF DETROIT, MICHIGAN.

DIFFERENTIAL GEARING.

Application filed April 19, 1919. Serial No. 291,223.

*To all whom it may concern:*

Be it known that I, MAXIMILIAN J. L. TOWLER, a citizen of the United States of America, residing at Detroit, in the county of Wayne and State of Michigan, have invented certain new and useful Improvements in Differential Gearing, of which the following is a specification, reference being had therein to the accompanying drawings.

This invention relates to gearing wherein two driven members are free to rotate independently, one at a greater speed than the other, and power is applied equally to both when rotating at the same speed, and more particularly to what is commonly known as differential gearing for transmitting power to the driving wheels of a motor vehicle and the like, wherein it is desirable that the members or wheels to which power is transmitted for turning the same, may have relative rotative movement.

So called differential mechanisms as commonly constructed and embodied in motor vehicle constructions, are defective in that the power is applied thereby to the driven member or wheel offering the lesser resistance and the member offering the greater resistance may therefore remain stationary while the other is rotated without effecting a forward movement of the vehicle, as when one wheel has little or no traction. The object of this invention is to overcome this defect by introducing into gearing of any desired construction for the purpose, the well known principle in mechanics that where two relatively rotative bodies are in frictional contact, no amount of force so directed as to be within the limits of the angle of friction will effect rotation, and in so applying this principle that the preponderance of power will be applied to the driven member offering the greater resistance to turning moment.

A further object is to provide a simple, compact and efficient construction particularly applicable to motor vehicle construction, and which will effect the application of a large proportionate percentage of the driving torque to the driven member offering the greater resistance, and to provide certain other new and useful features in the construction and arrangement of parts.

With the above and other ends in view the invention consists in the matters hereinafter set forth and more particularly pointed out in the appended claims, reference being had to the accompanying drawings, in which—

Figure 1 is a longitudinal vertical section through a device illustrative of the invention;

Fig. 2 is an end elevation of one part of the divided casing shown in Fig. 1 and showing the gearing in elevation therein;

Fig. 3 is a diagrammatic view of one of the trains of gears shown in Fig. 2;

Fig. 4 is a sectional detail illustrative of a modified form of drive for the cage;

Fig. 5 is a view similar to Fig. 1 illustrative of a modification in the construction;

Fig. 6 is a view similar to Fig. 2 and illustrating the construction shown in Fig. 5;

Fig. 7 is a diagrammatic illustration of a train of gears shown in Fig. 6;

Fig. 8 is a sectional detail similar to Fig. 4 showing a modified form of drive for the cage illustrated in Fig. 5;

Figures 9, 10:
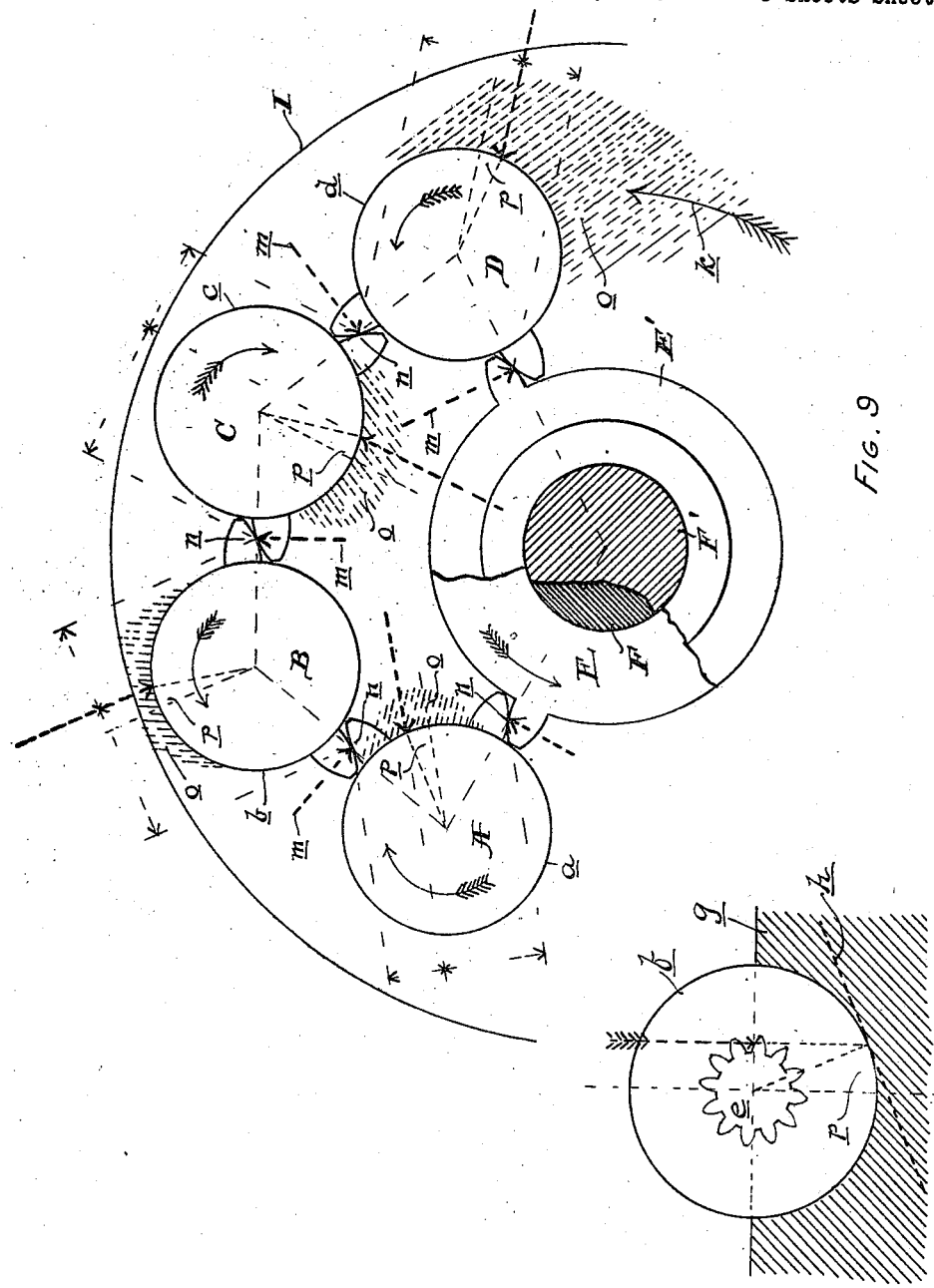
Fig. 9 is a diagram illustrative of the arrangement of gears shown in Fig. 2 and their operation.
Fig. 10 is a diagram illustrative of the basic principle of operation.

In Fig. 9 is diagrammatically illustrated the application of this principle to an arrangement of gearing for driving two independently rotatable members and permitting of rotation of said members at relatively different speeds, as in the so-called differential mechanisms for driving the traction wheels of a self-propelled vehicle and the like, where it is desirable to permit one wheel to rotate faster than the other. By employing this principle in such gearing, it is possible to so change the leverages of the gears that a preponderance of the power will be applied to the driven member offering the greater resistance to turning movement, as, for instance, when the driven member or gear E' (Fig. 9) offers greater resistance to turning than the driven member or gear E, as in motor vehicle construction when E' is secured to a shaft for transmitting motion to one traction wheel which is on hard ground and E is secured to another and separate shaft for transmitting motion to the other traction wheel which is on very soft ground.

In so called differential mechanisms, the means for connecting the driven members (such as E and E') so that both will be driven and one permitted to turn independently of the other, always embodies members rotatable upon their own axes and revoluble about said members, and by so mounting and arranging one or more of these rotatable members as to take advantage of the angle of friction, the leverage of such connecting means may be so shifted as to cause said means to impart a greater turning force to the member driven thereby which offers the greater resistance, than will be applied to the driven member having the lesser resistance, and this principle may be applied to any desired construction embodying one or more rotating members operatively connecting the driven members of the mechanism.

As illustrative of an embodiment of the invention, a construction is shown in Figs. 1 and 2 wherein the driven members are gears E and E' secured upon the adjacent ends of independently rotatable alined shafts F and F', respectively. The means for operatively connecting and driving these gears and their shafts comprises two trains of gears A, B, C, D, and A', B', C', D', said gears being formed with journals $a, b, c, d$ and $a', b', c', d'$, respectively. The journals of all of the gears engage bearings in the side walls G.H, of a suitable cage I which is mounted to turn freely upon the shafts F, F', and which cage is rotated by means of a suitable worm gear J secured between peripheral flanges on the two halves G.H, of the cage by means of bolts K, which also serve to secure the halves together, with all of the gears inclosed therein. Any suitable means may be provided for driving the cage, and in Fig. 4, a bevel ring gear L is shown as secured to the periphery of the cage.

The journals of the gears of both trains of gearing are made as large in diameter as practicable being equal to the diameter of the gears at the roots of their teeth, to give each journal as broad or extended an angle of friction relative to the pitch diameter of their gears, as possible, for the purpose to be hereinafter more fully set forth, and the intermediate gears B, C, B', C' of the two trains are preferably offset radially relative to the gears A, D, A', D', so that they are out of engagement with both of the driven gears E, E', said intermediate gears of each train being in mesh with each other and one gear C, C' having a face which is double that of the other gears so that it will mesh with the gear D, D' of its train which in turn meshes with the driven gear E'. The other end gears A, A' are in mesh with the driven gear E so that said driven gears E, E', are operatively connected by the two trains of gearing and motion is imparted thereto through said trains to drive their shafts, by the turning of the cage I, said trains permitting relative rotation of said gears E, E', and their shafts in the usual manner.

In Figs. 5 and 6, a slight modification of the construction and arrangement of gearing is shown to permit the concentric arrangement of the trains of gearing 1, 2, 3, 4 and 1', 2', 3', 4', about the driven gears 5, 5' and their shafts 6, 6', the gears of said trains being provided with enlarged journals as before, mounted in bearings in the walls or two parts 7 and 8 forming the cage which is driven by the worm gear 9 as shown in Fig. 5, secured to the cage by bolts 10, or driven by the bevel ring gear 11 as shown in Fig. 8. In this construction the gears 5 and 5' are spaced apart to provide a space for the intermediate gears 2, 3, and 2', 3' of the two trains of gearing. In this construction the case may be of slightly less diameter than in the construction shown in Figs. 1 and 2, but in the construction shown in said Figs. 1 and 2, the arrangement permits of shortening the case an amount equal to the width of the intermediate gears of each train shown in Figs. 5 and 6.

The operation of the invention as applied to the illustrative arrangement of gearing as shown in Figs. 1 and 2, is illustrated in Fig. 9, the driven gears E, E', and a driving train of gears A, B, C, D, with their enlarged journals $a, b, c, d$, being shown diagrammatically. The rotatable cage I in which the train of gearing is mounted is also indicated, and the direction of rotation of said cage is indicated by the arrow $k$.

If the resistance to turning movement of the driven gears E, E' is equal, then there will of course be no rotative movement of the gears of the train upon their axes but they will be revolved as a unit with the cage, and by their engagement with the driven gears, rotate said gears and their shafts therewith without relative turning movement of the shafts. If, however, the resistance to turning movement of one gear is greater than the other, then relative rotation of said driven gears is permitted due to their connection through the train of gearing.

Assuming that of the driven gears, the gear E' offers the greater resistance to turning movement, and assuming also that instead of the train of gearing being mounted upon enlarged journals, they be mounted to turn freely or without journal friction, then the gear D will roll around upon the gear E', transmitting motion through C. B. A, which will drive the gear E forwardly or in the direction indicated by the arrow $k$. If however, the gears A, B, C, D, are provided with enlarged journals $a, b, c, d$, as shown, the angle of friction of the several journals will change the leverage of the gear train and a preponderance of the effective power applied to turn said gears E, E' will be applied to the gear E'.

The application of power to each gear A, B, C, D, to turn the same is indicated by the dotted arrows m and the load resistance is applied at n. Each gear therefore represents a power lever the length of which is the distance between the points m, n and the fulcrum of which is the axis of the gear. The fulcrum of this power lever is however in effect shifted by the angle of friction of the journals which is made effective by providing each gear with journals which are as large in proportion to the diameter of the gears as it is practicable from a manufacturing standpoint, to make them. If these journals could, in a practical construction, be made of such a size that the force applied at m would come within the angle of friction of the journals, the gears would be locked, as no amount of force so directed as to be within the limiting angle of friction would result in turning the gears but would only increase the frictional contact of the journals with their bearings, and as this bearing friction increases in direct proportion to the load or power applied, the angles of friction of the journals do not change with the varying load or power and therefore, the power leverage of each gear is constant.

Under the assumption that the gear E′ offers a greater resistance to turning movement than gear E, then a force tending to revolve the casing in the direction of the arrow k, and the reaction through gear D against gear E′, will tend to turn the gears D, C, B, A, which will react upon their journal bearings in the direction and areas o indicated by the broken shade lines, and as these gears are turned in the direction indicated by the arrows thereon, the centers of bearing of the gears, which are their lever fulcrums are shifted due to the angle of friction, so as to produce in effect a series of short and long lever arms which finally deliver to gear E a much less force tending to turn it than is received by gear E′. In other words, either of the gears E or E′ which offers the greater resistance to turning will receive the greater part of the force tending to turn the casing. The number of gears in the train may be more or less, according to the design of the mechanism, but to give a compact, simple and symmetrical mechanism particularly adapted for use in motor vehicle construction, two trains of gearing of four gears each, with the intermediate gears of each train offset radially to shorten the overall length of the device, seems to be the preferable arrangement.

Obviously, the desired result, to-wit, the application of a large proportion of the effective driving power to the driven member or traction wheel offering the greater resistance, may be secured in various forms and arrangements of differential mechanisms by constructing the mechanism connecting the two driven members thereof in such manner that the leverage of said mechanism will be affected by the angle of friction to effect such application of power, and I do not therefore limit myself to the construction or arrangement of gearing shown.

Having thus fully described my invention what I claim is:

1. In a differential gearing, a driving member, driven members, gearing connecting said members, comprising gears supported in the driving member by journaled portions, the diameters of which have such a relation to the diameters of the pitch circles of the last mentioned gears that a preponderance of the power delivered to the driving member will be transferred to the driven member offering the greater resistance to rotation.

2. In a differential gearing, a driving member, driven members, means connecting said driven members for differential turning movement and for driving said members, said means including a gear having journaled portions the diameters of which portions have such relation to the pitch diameter of said gear that a preponderance of the power delivered to the driving member will be applied to the driven member offering the greater resistance to rotation.

3. In differential gearing wherein driven members may be rotated in unison or relative to each other; of gearing operatively connecting said driven members to effect differential motion between said members and including a driving member rotative upon an axis co-incident with the axis of rotation of said driven members and gears connecting said driven members and mounted upon said driving member, said gears being provided with journals mounted in bearings on said driving member with their axes parallel with the axis of rotation of said driven members, each journal having a diameter relative to the pitch diameter of said gears which is such that a preponderance of power delivered to the driving member will be applied to the driven member offering the greater resistance to rotation.

4. Differential gearing comprising rotative driven gears, a carrying member rotatable about the axis of the driven gears, a train of gearing for transmitting motion to and from one to the other of said driven gears, comprising four or more meshing gears with one end gear of the train in mesh with one of the driven gears and the other end gear of the train in mesh with the other driven gear, journal bearings on the carrying member for all of the gears of the train, and means for turning the carrying member.

5. Differential gearing comprising rotatable driven gears, a carrying member rotatable about the axis of the driven gears, a train of reversible gearing, one end gear of said train being in mesh with one driven gear and the other end gear of the train in mesh with the other driven gear, the intermediate gears of the train being offset radially to clear said driven gears, journal bearings on the carrying member for said gears of the train, and means for turning the carrying member.

6. Differential gearing comprising alined and independently rotatable driven shafts, driven gears on the adjacent ends of said shafts, a carrying member rotatable about the axis of said shafts, means for rotating said carrying member, and two trains of reversible spur gears mounted upon said carrying member with the longitudinal axes of the gears extending parallel with the axes of the shafts and with one end gear of each train in mesh with one driven gear and the other end gear of each train in mesh with the other driven gear, the intermediate gears of each train being off-set radially to clear the driven gears.

In testimony whereof I affix my signature in the presence of two witnesses.

MAXIMILIAN J. L. TOWLER.

Witnesses:
   LEWIS E. FLANDERS,
   ANNA M. DORR.